United States Patent
Akashi et al.

[11] Patent Number: 5,891,357
[45] Date of Patent: Apr. 6, 1999

[54] OPTICAL ELEMENT AND METHOD OF MANUFACTURING THE SAME, AND MACROMOLECULAR LIQUID CRYSTAL FOR AN OPTICAL ELEMENT

[75] Inventors: Ryojiro Akashi; Hidehiko Soyama; Takashi Uematsu, all of Minami-Ashigara, Japan

[73] Assignee: Fuji Xerox Co., Ltd., Tokyo, Japan

[21] Appl. No.: 719,076

[22] Filed: Sep. 24, 1996

[30] Foreign Application Priority Data

Sep. 27, 1995 [JP] Japan ................................. 7-249793
Aug. 22, 1996 [JP] Japan ................................. 8-221294

[51] Int. Cl.$^6$ ............................ C09K 19/52; C09K 19/38
[52] U.S. Cl. ........................ 252/299.01; 349/182; 428/1
[58] Field of Search .......................... 252/299.01; 428/1; 349/182, 193

[56] References Cited

U.S. PATENT DOCUMENTS

| | | | |
|---|---|---|---|
| 4,994,204 | 2/1991 | Doane et al. | 252/299.01 |
| 5,021,475 | 6/1991 | Isayev | 524/30 |
| 5,087,929 | 2/1992 | Takanashi et al. | 346/108 |

FOREIGN PATENT DOCUMENTS

A-3-284988  12/1991  Japan .

*Primary Examiner*—Shean C. Wu
*Attorney, Agent, or Firm*—Oliff & Berridge, PLC

[57] ABSTRACT

An optical element comprises a molded body of a composition of a cross-linked macromolecular liquid crystal and a resin. An optical element composed of a macromolecular liquid crystal composition where the granules of the cross-linked macromolecular liquid crystal are dispersed into the resin as a binder is preferable. The element can be made by preparing in advance granules of the cross-linked macromolecular crystal liquid by a physical or chemical crushing manner, dispersing the granules in the binder, and then molding it.

24 Claims, 1 Drawing Sheet

5,891,357

OPTICAL ELEMENT AND METHOD OF MANUFACTURING THE SAME, AND MACROMOLECULAR LIQUID CRYSTAL FOR AN OPTICAL ELEMENT

BACKGROUND OF THE INVENTION

1. Field of the Invention

The present invention relates to optical elements comprising a macromolecular liquid crystal composition. The element includes a light scattering element, a light modulation element (an element for changing the phase, wavelength, strength, polarized face and so on of light), a dimming element (element for changing the transmission factor, reflection factor, and so on of light), a rewritable recording element, an optical recording element, a optical waveguide designed to control the transmission of light, a light switch designed to switch light, an optical element applicable to a photo coupler or the like designed to conduct photoconnection. The invention also relates to a method of manufacturing optical elements, and macromolecular liquid crystal composition for an optical element.

2. Description of Related Art

Attention has been paid to a macromolecular liquid crystal, as a novel functional material. Known are a rewritable recording element, which is an application of the macromolecular liquid crystal and capable of recording images reversibly by an external stimulus, an optical recording element, further an optical compensating element, an orientation film (JP-A No. 63-223066, JP-A No. 62-14114, JP-A No. 2-42415, JP-A No. 2-3021, JP-A No. 3-59622) and the like. Generally these elements are composed of a macromolecular liquid crystal formed on a substrate. Various examples of these constructions are illustrated, for example, in Polym. Commun. Vol. 24, 364 (1983), Japan Display, 290 (1986).

Also, to improve a function of a macromolecular liquid crystal, JP-A No. 3-284988 proposes a light scattering type recording element capable of rewriting, an element having two electrodes sandwiching a composite film where the macromolecular liquid crystal is dispersed in a granular form in a resin, or macromolecule. In the element, local heating is carried out with laser or the like to reversibly change one portion of it from light scattering condition into transparent condition to effect a recording operation. According to the publication, by dispersing the macromolecular liquid crystal in a granular shape into the macromolecule, refractive index difference at their interface is caused so that contrast and resolution can be improved. Further, a specific method of manufacturing the light scattering type optical recording element is also described. The manufacturing method comprises the steps of mixing a precursor, i.e., a mesogen monomer of the macromolecular liquid crystal is mixed with a macromolecular binder precursor, thermally annealing them at a temperature such that the mesogen monomer shows a liquid crystal phase, to separate the mesogen monomer phase from the macromolecular binder precursor phase, polymerizing each of them with ultraviolet ray or the like, to make a composite film where the macromolecular liquid crystal is dispered in the binder resin, in a granular shape.

However, in the above-described art satisfactory contrast cannot be obtained. There remains improvement on structural stability.

SUMMARY OF THE INVENTION

The present invention is to solve the above-described problems. A first object thereof is to provide an optical element improved in its light scattering characteristic and in its structural stability.

A second object of the present invention to provide a method of manufacturing such an optical element.

A third object of the present invention is to provide a macromolecular liquid composition suitable for manufacturing an optical element improved on its optical characteristics such as light scattering characteristics, and its structural stability.

The first object can be achieved by an optical element comprising a molded body of a composition of a cross-linked macromolecular liquid crystal and a resin. The molded body referred to in the present invention includes a body in a layer form, made by any method.

The present inventors have accomplished the present invention, based on finding that not only constructional characteristics of optical elements, but also optical characteristics are improved by cross-linking macromolecular liquid crystal in the composition of a macromolecular liquid crystal and a resin. It is considered that the macromolecular liquid crystal itself is cross-linked, so that the construction thereof will be strengthened and the construction contributing to liquid crystal functions for exhibiting optical characteristics will be also stabilized. Further, it is preferable that the macromolecular liquid crystal is in a granular form. Thus, it is possible to obtain further superior optical characteristics, and physical characteristics.

The second object can be achieved by a method of manufacturing the above-mentioned optical element which comprises the steps of adding (preferably using heat or a solvent) into a resin a macromolecular liquid crystal prepared in advance, cross-linking the macromolecular liquid crystal, and molding (including film-forming) the composition obtained.

Also, in the case that the optical element of the present invention comprises granules of a cross-linked macromolecular liquid crystal and a resin, it can be obtained by the method comprising the steps of preparing the granules of the cross-linked macromolecular liquid crystal in advance by a physically or chemically crushing manner, or by a granule production polymerizing method; adding the granules into the resin; and molding the composition.

In the manufacturing method disclosed in the above described JP-A No. 3-284988, it is difficult to completely separate a mesogen monomer phase from a macromolecular binder precursor phase. Thus, impurities which are generated from the binder or the like are likely to be contained in the granules of the prepared macromolecular liquid crystal. Also, it is difficult to control the size and the density of the granules of the macromolecular liquid crystal. Because of these matters, the optical characteristics such as a light scattering characteristic are likely to become worse or undesired. In the method of manufacturing the optical element of the present invention, it is avoidable that impurities are contained in the macromolecular liquid crystal, because the macromolecular liquid crystal is prepared in advance or is prepared in a cross-linked, granular form in advance, and it is used. When the macromolecular liquid crystal is granular, it has advantages in that the granular diameter thereof is easy to be controlled.

The third object can be achieved by a macromolecular liquid composition for an optical element comprising a mixture of a resin and a cross-linked macromolecular liquid crystal.

DESCRIPTION OF PREFERRED EMBODIMENTS OF THE INVENTION

Figure 1:
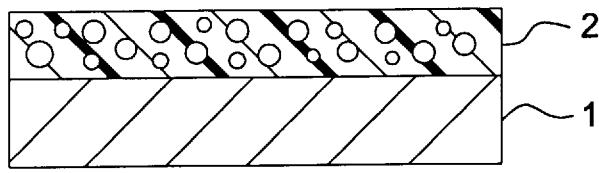
FIG. 1 is a model sectional view showing one construction example of the optical element of the invention.

The present invention will be described hereinafter in further detail.

The macromolecular liquid crystal composition to be used in the optical element of the present invention is composed of a cross-linked macromolecular liquid crystal, and a resin functioning as a binder. In the mixed form of the cross-linked macromolecular liquid crystal and the resin, the respective components are preferable to be separated into different phases. Specific embodiments thereof include an embodiment in which a cross-linked macromolecular liquid crystal is dispersed in a granule form, or in which it is dispersed as continuous layer(s) of a network shape. Especially an embodiment in which a cross-linked macromolecular liquid crystal is dispersed in a granular form is preferable in terms of optical characteristics and physical characteristics of the composition.

Such an optical element as described hereinabove can be manufactured preferably by preparing in advance cross-link granules of a macromolecular liquid crystal, then adding the granules into a resin, and molding the obtained composition.

At first, the cross-linked macromolecular liquid crystal and a process of manufacturing it will be described in connection of the method.

As the macromolecular liquid crystal, main chain type and side chain type macromolecular liquid crystals are known, where a mesogen (a moiety showing liquid crystal property) is present in a main chain or side chain, respectively. In the optical element of the present invention, either one or both of them can be used. However, the liquid crystal is preferable to be selected from the side chain type macromolecular liquid crystals capable of exhibiting various liquid crystal functions depending on the type of the side chain, and particularly, is more preferable to be selected from the side chain type of macromolecular liquid crystals having a mesogen moiety and a non-mesogen moiety in its side chain. In such a macromolecular liquid crystal, an internal construction of scattering light strongly is likely to be formed by the existence of the non-mesogen moiety. Also, it is possible to control its thermal physical properties or phenomena, such as phase transition. In addition, the non-mesogen moiety can be used as a cross-linking reactive group.

The macromolecular liquid crystal can be normally produced by polymerization of a polymerizable mesogen compound or by addition of an addition reactive mesogen compound to an addition reactive (pre) polymer such as poly(hydrogensiloxane). Such an art is disclosed in Makromol. Chem., p273, 179 (1978), Eur, Polym. J., 18, p651 (1982), Mol. Cryst. Liq. Cryst., 169, p167 (1989) or the like. The macromolecular liquid crystal in the present invention can be also produced in a similar manner.

The macromolecular liquid crystal is cross-linked in the present invention, Methods therefor include a method (1) of producing in advance a macromolecular liquid crystal containing a reactive group as one moiety of a main chain or a side chain, (optionally adding a catalyst and a polyfunctional reactive compound when desired), and cross-linking the liquid crystal through the reactive group by providing energy such as heat, light, or electron ray thereto, and a method (2) of mixing a precursor (namely, a mesogen monomer) of a macromolecular liquid crystal and a cross-linking monomer and polymerizing them. An example of the art of the cross-linked macromolecular liquid crystal is disclosed in Makromol. Chem. Rapid Commun., Vol. 2, 317 (1981), Makromol. Chem., Vol. 188,667 (1987), Polymer, Vol. 28,639 (1987), Makromol. Chem., Vol. 187,1915 (1986).

In the above-described method (1), a macromolecular liquid crystal is prepared in advance which has, as a reactive group, an introduced, additionable or polymerizable group such as a vinyl group, acrylate group, methacrylate group, epoxy group, or isocyanate group; or an introduced group capable of condensation or the like such as a hydroxyl group, amino group, acid amide group, thiol group, carboxyl group, sulfonic acid group, phosphorus acid group, metal alcoholate group, or magnesium halide (Grignard) group. This macromolecular liquid crystal can be prepared by, for example, co-polymerization or co-addition of a monomer (reactive monomer) having a reactive group with a polymerizing mesogen compound, or with an addition reactive mesogen compound and an addition reactive (pre) polymer.

Representative examples of the mesogen compound or the addition reactive mesogen compound to be used for it include various compounds where a group such as acrylic acid ester, methacrylic ester group, or vinyl group is bonded through an alkyl spacer having a given length to a rigid molecule (a mesogen) such as a biphenyl, phenylbenzoate, cyclohexylbenzene, azoxybenzene, azobenzene, azomethine, phenyl pyrimidine, diphenyl acetylene, biphenyl benzoate, cyclohexyl biphenyl or tarphenyl type molecule.

Representative construction examples of these compounds are shown hereinafter.

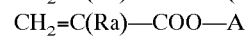

wherein, Ra represents a hydrogen or a methyl group, L is an integer of from 1 through 30, A is selected from the following structural examples.

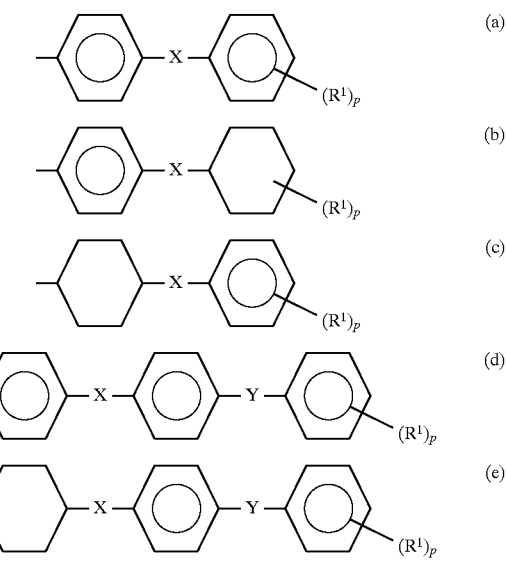

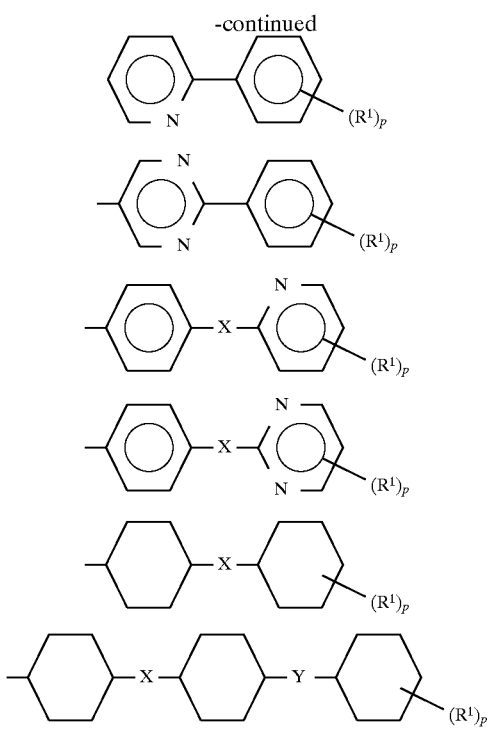

wherein, Y and Y each independently represent a group selected from a single bond, —N=N—, —N(O)=N—, —CH=N—, —N=CH—, —COO, —O(C=O)— and an ethynyl group, $R^1$ represents a group selected from an alkoxy group, a halogen, a cyano group, a carboxy group and an alkyl group, p shows an integer of from 1 through 5, the respective $R^1$ may be different from each other in the case where p is 2 or more.

A preferable example among them is

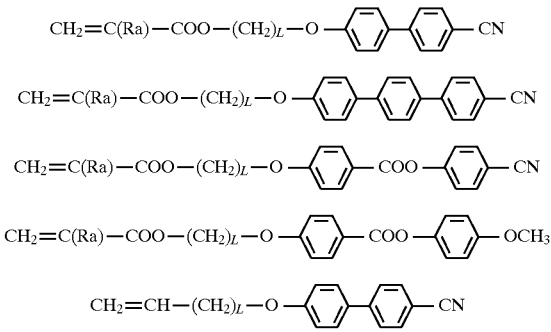

Also, examples of the reactive monomer co-polymerizable or co-additionable for cross-linking include (meta)acrylic acids, (meta)acrylic acid esters or amide compounds, such as (meta)acrylic acid, ω-carboxy-polycaprolactone-mono(meta)acrylate, hydroxyethyl(meta) acrylate, hydroxypropyl(meta)acrylate, 2-(meta) acryloxyethyl acid phosphate, 2-hydroxy-3-phenoxy propyl (meta)acrylate, 2-(meta)acryloxyethyl succinate, mono-vinyl phthalate, 2-(meta)acryloxyethylphthalate, maleic acid, 4-(meta)acryloxyalkyloxy-benzoic acid, glyceryl (meta)acrylate, meta(acryl)amide, N,N-dimethyl amino ethyl(meta)acrylate, N,N-diethyl amino ethyl (meta) acrylate, glycidyl(meta)acrylate; vinyl compounds such as vinyl sulfonate, styrene compounds such as hydroxy group substituted styrene; and unsaturated compounds such as 2propene-1-ol, or 5-hexene-1-ol.

The reactive monomer is not limited to the examples described hereinabove.

In the present invention, other component may be copolymerized, co-added or the like for obtaining desired characteristics. For example, for improvement in light scattering characteristics and further improvement in thermal characteristics, preferably, the following is copolymerized or co-added: (meta)acrylic acid alkyl ester and a derivative thereof, styrene and a derivative thereof, vinyl acetate, (meta)acrylonitrile, vinyl chloride, vinylidene chloride, vinylpyrrolidone, 1-hexene, 1-octene or the like.

The copolymerizing or co-adding amount of the above described reactive monomer into the macromolecular liquid crystal is preferable in the range of 0.1 mol % to 70 mol % as a monomer.

The macromolecular liquid crystal can be synthesized by blending given, respective amounts of the above-described mesogen monomer and the reactive monomer and then radical copolymerization or ion polymerization thereof; or addition of the both monomers into an adding reactive (pre) polymer. The molecular weight of the macromolecular liquid crystal is in the range of 100 to 1,000,000 in weight average, and preferably in the range of 10,000 through 500,000.

The macromolecular liquid crystal prepared in this manner can be cross-linked as it is, by providing any one of the various types of energies thereto. However, it is preferable in efficiency to add a suitable catalyst and/or adding agent, including various types of ultraviolet ray polymerization initiator, thermal polymerization initiator, polyfunctional reactive compounds or the like. The polyfunctional reactive compound includes polyfunctional isocyanate compounds, polyfunctional epoxy compounds, polyfunctional melamine compounds, polyfunctional aldehyde compounds, polyfunctional amine compounds, and polyfunctional carboxyl compounds. Particularly preferred are thermal reaction agents suitable for thermal cross-linking, polyfunctional isocyanate compounds, polyfunctinal epoxy compounds, polyfunctional melamine compounds, polyfunctional aldehydes, polyfunctional amine compounds, and polyfunctional carboxyl compounds. The addition amount of the catalyst is preferable in the range of 0.1 to 50% by weight, and preferable in the range of 0.5 to 20% by weight of the macromolecular liquid crystal composition.

In the method (2), a mesogen monomer (for example, illustrated in the above-described constructional examples) and a cross-linking monomer are copolymerized; or an addition reactive mesogen compound and an addition reactive cross-linking compound are added to a reactive (pre) polymer. A compound capable of additional polymerization such as a polyfunctional vinyl compound, or polyfunctional (meta)acrylic compound is used as the cross-linking monomer. An addition reactive unsaturated compound such as a polyfunctional vinyl compound is used as the addition reactive cross-linking compound. The cross-linking compound content amount of the macromolecular liquid crystal is preferable in the range of 0.1 to 20% by weight. Also, the various compounds other than the mesogen compound described in the method (1) may be used for co-polymerization and coaddition. The polymerizing and adding method in the method (2) are carried out as in the method (1).

Any antioxidant such as a hindered amine, or a hindered phenol may be added to the macromolecular liquid crystal to be used in the invention to improve weatherability thereof. Also, for colorization, contrast improvement, light scattering improvement or the like, the following may be added: functional coloring matters such as various type of dichroism coloring matters or various types of fluorescent coloring matters, for example, anthraquinone-, styrene-, azomethine-, azo-coloring matters; various coloring matters (dye or pigment) other than them; or various types of filler for improving structural strength. Various types of laser light absorbing coloring matters (near infrared rays absorption coloring matters such as phthalocyanine, squalilium, or azulenium) are desirable to be added for improving the efficiency of recording with laser. The addition amount of the respective components described above is preferable in the range of 0.01 to 5% by weight. In addition to the above-described components, a liquid crystal compound having a low molecular weight may be added within the range of 1 to 20% by weight for improving characteristics of the macromolecular liquid crystal.

When the optical element of the present invention is used as a light scattering element or a heat sensitizing recording material, it is preferable in stabilization of light scattering characteristics, and improvement on recording/erasing characteristics of the heat sensitizing recording material to cross-link the micro construction of its macromolecular liquid crystal in the form of multi domain construction. The multi domain construction is a construction composed of a plurality of fine domains providing optical anisotropy (double refraction factor), and scatters light strongly. Stable light scattering construction can be provided by cross-linking the macromolecular liquid crystal in the form of the multi domain construction composed of plural domains having optical anisotropy, each of which has a specific size. About the sizes (diameters) of the domains in the multi domain construction, the case in which the peak of the distribution of the domains is in the range of 0.2 to 2.0 $\mu$m is preferable to scatter light most strongly.

Control of the multi domain construction can be effected by selecting the composition of the macromolecular liquid crystal, a thermal processing manner of the macromolecular liquid crystal, or the like.

A process for making the granules of the cross-linked macromolecular liquid crystal will be described hereinafter.

As a method of making the macromolecular granules, a method for physically or chemically crushing the macromolecular resin made in advance, or a granule production polymerizing method of forming the granules and simultaneously effecting the polymerization is generally used. Each of the methods will be described hereinafter.

The physical crushing method has the step of crushing the solid of a macromolecular liquid crystal cross-linked in advance by a dry crushing machine such as a micronizer an atomizer or a satellite mill, or a wet crushing machine such as a colloid mill to make it granular.

The chemical crushing method has the steps of liquefying with heating or solvent a macromolecular liquid crystal having a reactive group, mixing and stirring it into poor solvent of the macromolecular liquid crystal, further dispersing the mixture in granule forms, (optionally adding to the system various catalysts or adding agents), and promoting the removal of the solvent and the cross-linking reaction, for example, by heating. Also, granules obtained by the crushing method may be used in a condition where the granules are dispersed in solvent or may be used after taking the granules out through separation by a centrifugal separating method or a filtering method from the solvent and drying them. In dispersing the macromolecular liquid crystal in a granular form by stirring, any type of dispersing agent may be added, and the dispersed system may be heated. Energy other than heat may be used for cross-linking as described above. A mixer, homogenizer or the like may be used as in the conventional art, as a stirring apparatus, in formation of the granules.

Also, granules can be prepared by spraying a solution of the macromolecular liquid crystal composition into gas to remove its solvent, which is different from the above-described method.

Further, the macromolecular liquid crystal composition can be melted in a melted and heated resin and be stirred to form desired macromolecular liquid crystal granules and simultaneously dispersed them in the resin.

The granular production polymerizing method includes an emulsification polymerizing method, a suspension polymerization, a seed emulsification method, and a precipitation polymerization method. In the method, the raw materials referred to in the method (2) are usually used.

As described above, granules of the cross-linked macromolecular liquid are prepared in advance, apart from a resin as a binder. For this reason, the granules having a desired size can be obtained with ease. For example, classification can be used for it.

The shape of the granule is not restricted. Granules in any form may be used, such as in a globular, true sphere, oval, flat, needle, polyhedron, porous, or micro concave-convex form; or in so-called a donut shape having a hollow therein; or in a fibrous form.

The preferable size of the cross-linked macromolecule liquid crystal granule is normally in the range of 0.1 $\mu$m to 10 $\mu$m in its average granule diameter if the granule is spherical, preferably in the range of 0.1 $\mu$m to 5 $\mu$m, further preferably in the range of 0.2 $\mu$m to 2 $\mu$m. Also, in the case of the fibrous granule, its thickness is preferably in the range of 0.1 $\mu$m to 10 $\mu$m, more preferably in the range of 0.1 $\mu$m to 5 $\mu$m, still preferable range is 0.2 $\mu$m to 2 $\mu$m, although the length of the fiber is not restricted.

Then, the macromolecular liquid crystal composition where the granules of the cross-linked macromolecular liquid crystal are dispersed into a resin, and the process of making it will be described hereinafter.

Any resin (macromolecule) for exhibiting a binder function can be used (except resins which fall into the category of macromolecular liquid crystal) for the resin in which the granules of the cross-linked macromolecular liquid crystal are dispersed. Organic macromolecule may be used, such as polyester resins, polyether resins, polyurethane resins, polyamide resins, acrylic resins, polyimide resins, polyethylene resins, polypropylene resins, polyvinyl chloride resins, polyvinylidene chloride resins, polycarbonate resins, polystyrene resins, teflon resins, epoxy resins, polyvinyl alcohol resins, polyvinyl acetal resins, or cellulose resins. Inorganic macromolecule such as a sol-gel material of a silicon compound can be used.

The preferable resin includes polyvinyl alcohol resins, acrylic resins, polyester resins or polyimide resins.

The molecular weight of the resin, which is not restricted, is preferably 10,000 to 1,000,000 in weight average, more preferably is 20,000 to 500,000.

A binder of a low molecular weight may be used jointly as a binder.

To cross-link a binder, especially a macromolecular binder (that is, a resin) after the dispersion of the granules of the macromolecular liquid crystal is preferable from the viewpoint of stability. Cross-linking the macromolecular binder can be effected by a method similar to that for cross-linking the macromolecular liquid crystal. In particularly, by the use of thermal-setting resin, ultraviolet ray-setting resin, electronic ray-setting resin or the like for the macromolecular binder, the cross-linking can be effected efficiently.

A highly optically-transparent material can be used preferably as the binder. Also, a material is preferred which has a refraction index identical or similar to the refraction index of the macromolecular liquid crystal in an isotropic condition (the condition where liquid crystal moiety is oriented at random), from the viewpoint of the optical matching with the macromolecular liquid crystal for some using objects. More preferable refractive index difference is 0.2 or lower.

As a method of dispersing the macromolecular liquid crystal granules into the binder, the following may be used: a method of mixing, stirring and dispersing the macromolecular liquid crystal granules into a solution where the binder is solved in a solvent, forming the resultant into a predetermined shape, and subsequently removing the solvent, a method of heating and mixing at a temperature for softening the binder the macromolecular liquid crystal granules and the binder to disperse the macromolecular liquid crystal granules, forming the resultant into a predetermined shape, and subsequently cooling it, a method of mixing, stirring and dispersing the mactomolecular liquid crystal in a prepolymer (monomer, oligomer or the like) for forming the binder, forming the resultant into a predetermined shape, and polymerizing or setting it. Also, as described about the granule making method, granules formed in the binder (resin) in advance or in a solution including the binder can be used.

The macromolecular liquid crystal content of the composition comprising macromolecular liquid crystal and the resin is preferably in the range of 20% by weight to 99% by weight, more preferably in the range of 50% by weight to 95% by weight. When the content is less than the range, a desired optical characteristics, for example, light scattering property cannot be obtained. When it is more than the range, the binding effect of the resin is reduced, with possibility of reducing mechanical strength.

In the producing of the optical element, which passes through the step of shape-forming it, the shape-forming step may involve use of any conventional shape-forming or molding method, including any optical film making method, for example, an injection method, an extruding molding method, and a method of coating or laminating the macromolecular liquid crystal composition on a support body.

In the optical element of the present invention, the macromolecular liquid crystal is not restricted to a granular form. In this case, an optical element can be made by a method of manufacturing optical elements having the step of adding into the resin the macromolecular liquid crystal made in advance, cross-linking the macromolecular liquid crystal, and molding (or shape-forming) the composition obtained.

The macromolecular liquid crystal to be used in this method may be that in the description in the method (1). In the above-mentioned adding step, the resin and/or macromolecular liquid crystal is usually softened by heat or solvent, and then they are mixed. The cross-linking and molding in this method can be achieved by a manner similar to that explained already.

Figure 2:
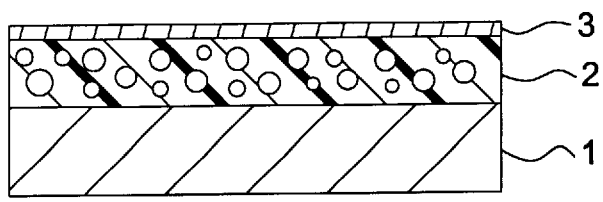
FIG. 2 is a model sectional view showing another construction example of the optical element of the present invention.
Figure 3:
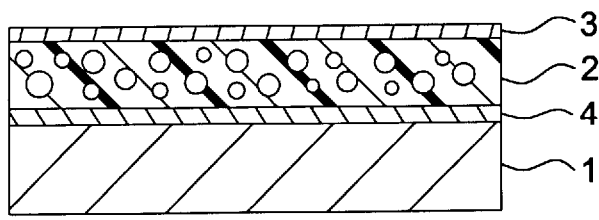
FIG. 3 is a model sectional view showing still another construction example of the optical element of the present invention.

FIGS. 1 to 3 are model sectional views showing construction examples of a light scattering type of optical element, using the macromolecular liquid crystal composition of the present invention.

FIG. 1 is a construction where a macromolecular liquid crystal composition layer 2 is provided on a substrate 1. FIG. 2 is a construction where a protective layer 3 is provided on the upper portion shown in FIG. 1. FIG. 3 is a construction where a light reflecting layer 4 is further provided between the substrate 1 and the macromolecular liquid crystal composition layer 2.

When the substrate 1 is in a sheet-shape, a resin film, any metallic film, paper, coating paper is preferably used. The resin includes polyester resins, polyether resins, polyester resins, polyurethane resins, polyamide resins, acrylic resins, polyimide resins, polyethylene resins, polypropylene resins, polyvinyl chloride resins, polyvinylidene chloride resins, polycarbonate resins, polystyrene resins, and teflon resins. Its thickness is selected from the range of 1 through 1000 $\mu$m, and more preferably, is in the range of 10 through 200 $\mu$m. Also, a substrate may be used other than the film-form member. For it, a resin substrate, a metallic substrate, a ceramics substrate, a glass substrate or the like may be used depending upon the using object. Also, a cubic, cylindrical, or fibrous substrate other than sheet substrate may be used. These substrate can be transparent, opaque or colored.

The thickness of the macromolecular liquid crystal composition 2 is preferably selected from the range of 0.1 $\mu$m through 50 $\mu$m, in the preferable thickness and more preferable range is 1 $\mu$m through 20 $\mu$m.

Preferably, the protective layer 3 is formed preferably for prevention of surface deterioration. Higher heat-proof is desirable for the protective layer 3. Preferably, a resin may be used such as fluorine resin, silicone resin, thermal-setting resin, ultraviolet ray-setting resin, or electronic ray-setting resin. Plural protective layer 3 may be laminated. Also, the thickness of the protective layer 3 is selected preferably from the range of 0.1 to 20 $\mu$m.

The light reflection layer 4 is preferably formed for improvement on a light scattering degree in the case of a light scattering type device. As shown in the drawing, the light reflection layer 4 is preferably formed not only between the substrate 1 and the macromolecular liquid crystal dispersion composition layer 2, but also on the back surface of the substrate 1. A metallic film such as aluminum, silver, tin, magnesium, gold, or platinum is preferably used as the material of the light reflection layer 4. Any vapor deposition method, sputtering method or the like can be used. The preferable thickness of the layer 4 is in the range of 1 nm through 100 $\mu$m.

In the optical element of the present invention, various layers such as a colored layer, a adiabatic layer, a print layer, a magnetic recording layer, and an optical recording layer are preferable to be formed, in addition to the above-described layers.

The element shown in FIG. 1 is possible to be applied as a light scattering device, those shown in FIG. 2 and FIG. 3 as a rewritable recording device capable of reversibly recording by heat.

The optical element of the present invention has high forming stability and solvent resistance, and is superior not only in optical characteristics such as a light scattering property, but also in structural stability and durability because the macromolecular liquid crystal in the composition for composing it is cross-linked.

Also, the method of manufacturing optical elements of the present invention involves making a macromolecular liquid crystal in advance, or making granules of a cross-linked macromolecular liquid crystal before they are dispersed into a resin as a binder. Because of this matter, impurities are hard to be mixed into the macromolecular liquid crystal, especially into the granular macromolecular liquid crystal. Thus, the macromolecular liquid crystal exhibits high solvent-resistance, and desired optical characteristics can be easily obtained and are difficult to turn worse. Also, because of the above-described matters, the freedom degree of the raw material selection is higher.

EXAMPLES

Example 1

Preparation of cross-linked macromolecular liquid crystal composition 4-acryloxyhexyloxy-4'-cyano-biphenyl (475 g) was provided as a mesogen monomer, and 2-hydroxyethyl methacrylate (25 g) was provided as a monomer having a hydroxy group as a reactive group. They were polymerized with AIBN (azo isobutyl nitrile) as an initiator (1.0 g). In MEK (methyl ethyl ketone )(1000 g) as a solvent, the resultant was precipitation-purified twice with the use of ethyl alcohol, to prepare a macromolecular liquid crystal (about 500 g) shown in constitutional formula (I) having a molecular weight of approximately 100,000.

A polyfunctional isocyanate compound [4,4'-diphenyl methane diisocyanate] (4 g) as a cross-linking agent, MEK/ toluene [1/1 w/w] (100 g) as a solvent were added to the macromolecular liquid crystal (100 g) to prepare a macromolecular liquid crystal solution. It was poured into a teflon beaker, and the solvent was removed by heating. Thereafter, it was heated at 60° C. for 48 hours and was cross-linked.

Constitutional formula (I)

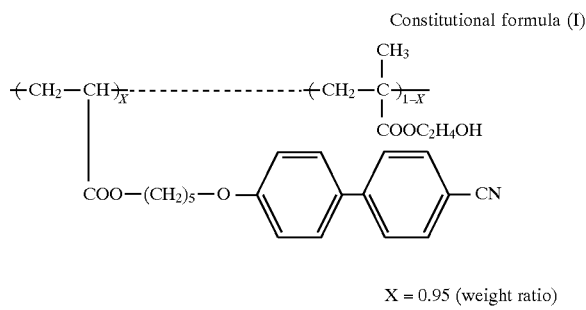

X = 0.95 (weight ratio)

Preparation of macromolecular liquid crystal granules 1

A lump of the macromolecular liquid crystal cross-linked was taken out from the teflon beaker, and was crushed with the use of an automatic mortar and a mixer. Macro granules were separated off by classification, thereby obtaining approximately 50 g of cross-linked macromolecular liquid crystal of approximately 2 μm in average granular diameter.

Preparation of macromolecular liquid crystal dispersed composition

Ten grams of granules of the cross-linked acromolecular liquid crystal were mixed into a solution where ultraviolet ray-setting resin [Kayarad: made by Nippon Kayaku Co., Ltd.] (5 g) was solved in isopropyl alcohol (20 g). Granules were dispersed through a stirring operation with addition of glass beads. The dispersed solution was applied (after removing glass beads), with the use of a wirebar, onto a PET film of 100 μm in thickness and was dried. After the drying operation, ultraviolet ray was illuminated to the film, so as to harden it and form a layer of macromolecular liquid crystal dispersed composition of approximately 6.0 μm in thickness. The composition caused light to be scattered strongly so that appearance was white turbidity.

On the back surface of this film, a PET film with an aluminum layer being formed was superposed as a reflection layer. The reflection optical density thereof was measured by X-rite 404 (made by X-rite company). It was superior (Optical Density (O.D.)=0.14).

Example 2

Ten grams of granules of the cross-linked macromolecular liquid crystal made in Example 1 were mixed in solution where 5 g of polymethyl methacrylate resin was solved into toluene (40 g). The granules were dispersed by addition of the glass beads and stirring. The dispersed solution was applied, with the use of a wirebar, on a PET film of 100 μm in thickness, and was dried to form a layer of macromolecular liquid crystal dispersed composition of approximately 6.0 μm. The composition caused light to be scattered strongly so that appearance was white turbidity.

After an ultraviolet ray-setting resin (Aronix: made by Toagosei Chemical Industry Co., Ltd.) containing a filler of calcium carbonate of 1% was applied and dried likewise on the macromolecular liquid crystal dispersion composition layer, it was cured by illumination of ultraviolet ray, to form a protective layer of approximately 2 μm in thickness.

According to the measurement as in Example 1 of the reflection optical density of the sheet, it was superior. (O.D.=0.15)

Example 3

Preparation of macromolecular liquid crystal granules 2

The macromolecular liquid crystal (100 g) shown in constitutional formula (1) prepared in Example 1 was solved in 100 ml of chloroform. Further, polyfunctional isocyanate compound [4,4'-diphenyl methane diisocyanate] (4.0 g) was added thereinto. The solution was put into a teflon vessel. Water (100 ml) where 1% of polyvinyl alcohol was solved was gradually added dropwise into it while high-speed stirring operation was conducted with a homogenizer stirring apparatus. The solution became emulsified during the addition. Further, water (200 ml) was added thereinto while high-speed stirring operation was conducted. Thereafter the outer portion of the teflon vessel was heated to 60° C. to remove the solvent and bridge the liquid crystal for 24 hours. After the reaction completion, the macromolecular liquid crystal granules dispersed into the water were taken out and dried. The macro granules were separated off by classification to obtain approximately 80 g of granules of cross-linked macromolecular liquid crystal of 2.5 μm in average granular diameter.

Preparation of macromolecular liquid crystal dispersion composite

The granules (10 g) of the cross-linked macromolecular liquid crystal were applied, in a method similar to that of Example 1, on a PET film of 100 μm thick, and formed into a layer of macromolecular liquid crystal dispersion composition of approximately 6.0 μm thickness. The composition caused light to be scattered strongly so that appearance was white turbidity.

A PET film with an aluminum layer being formed was superposed on the back surface of the above-mentioned film, as a reflection layer. The reflection optical density was measured by X-rite 404 (made by X-rite company). It was superior. (O.D.=0.16)

Example 4

A solution was prepared where the macromolecular liquid crystal (50 g) shown in the constitutional formula (I) prepared in Example 1 and a polyfunctional isocyanate compound [4,4'-diphenyl methane diisocyanate] (2.0 g)

were solved into methylene chloride (100 g). It was added into a water solution (200 g) of 10% polyvinyl alcohol [PVA] for two minutes while being stirred at high speed (10,000 rpm) by the use of a homogenizer. Further, the methylene chloride was removed while stirring operation was conducted under a reduced pressure. A solution was obtained where granules of the macromolecular liquid crystal were formed and simultaneously dispersed into PVA water. The average granular diameter of the granules of the formed macromolecular liquid crystal was approximately 0.5 $\mu$m.

The solution was applied, in a method similar to that of Example 1, on a PET film of 100 $\mu$m thick, and formed into a layer of macromolecular liquid crystal dispersion composite of approximately 6.0 $\mu$m thickness. The macromolecular liquid crystal granules in the composition were cross-linked by heating at 60° C. of it for 24 hours. The composition caused light to be scattered strongly so that appearance was white turbidity.

Further, a protective layer was formed, as in Example 2, on the macromolecular liquid crystal composition layer.

A PET film with an aluminum layer being formed was superposed on the back surface of the above-mentioned film, as a reflection layer. The reflection optical density was measured by X-rite 404 (made by X-rite company). It was superior. (O.D.=0.12)

Comparative Example 1

The macromolecular liquid crystal (200 g) shown in the constitutional formula (1) described in Example 1 was crushed by the same method as in Example 1, except that the addition of the cross-linking agent was not added, granules (approximately 100 g) of macromolecular liquid crystal of approximate 2 $\mu$m in average granular diameter not cross-linked were obtained.

A dispersion solution where the granules were dispersed in an ultraviolet ray-setting resin (Kayarad: made by Nippon kayaku Co., Ltd.) in the same composition and formulation as in Example 1 was applied with a wirebar on a PET film of 100 $\mu$m thickness, and was dried. Thereafter, it was hardened under illumination of ultraviolet ray. The formed macromolecular liquid crystal dispersion composition layer of approximately 6.0 $\mu$m was not so high in an optical scattering property and was low in turbidity. Also, according to the measurement similar to that of Example 1 in the reflection optical density of the sheet, it was low. (O.D.= 0.30) The analysis of the causes therefor proved that in the macromolecular liquid crystal, phase transition occurred by heat generated at the ultraviolet ray illumination so that its initial multi domain construction might be changed. In Example 1, the above-mentioned characteristics were not exhibited, even if in the macromolecular liquid crystal phase transition occurred, because its initial multi domain construction was retained by the stabilization based on the cross-linking.

Comparative Example 2

The granules of the macromolecular liquid crystal (not cross-linked) prepared in Comparative Example 1 were mixed into toluene solution of polymethyl methacrylate resin in the same composition and formulation as in Example 2 and stirred, so that the granules of the macromolecular liquid crystal were solved in toluene, thereby being separated from the polymethyl methacrylate resin solution layer. The solution was applied on the PET film and dried to form an uneven film having a low white turbidity degree on the basis of that the polymethyl methacrylate resin was unevenly separated from the macromolecular liquid crystal. It was difficult to use it for any optical element.

Evaluation of rewritable sensitizing characteristics

Sheets where the respective the macromolecular liquid crystal dispersion composition layers made in Examples 1 to 4 were white turbidity in their initial condition. Printing operation was effected with the use of a heat sensitizing printer bench (200 dpi, pulse width 2 msec., printing period 3 msec, recording energy 0.3 mj/dot) on the respective macromolecular liquid crystal dispersion composition layers of the sheets. As a result, the letters or the like were recorded, with the printing portions turning transparent. Further, the letters or the like could be erased by passing the sheets through a thermal roller apparatus heated to 100° C. Such a recording and erasing were possible to be repeated.

Evaluation of structural stability

According to the evaluation of durability by repeating of recording/erasing operations by 100 times on the samples made in Examples 1 to 4 and Comparative Example 1, it was found out that the optical density or the like hardly changed even after the repeating thereof by 100 times about the samples of Examples 1 to 3 and the construction strength was high in the macromolecular liquid crystal dispersion composition layers. About the sample of Comparative Example 1, its white turbidity degree was considerably lowered, and its optical characteristics were remarkably deteriorated, with low constructional strength.

What is claimed is:

1. A macromolecular liquid crystal composition for an optical element comprising a mixture of a resin and a cross-linked macromolecular liquid crystal comprising macromolecular liquid crystals cross-linked through a reactive group, wherein the cross-linked macromolecular liquid crystal is granular.

2. A macromolecular liquid crystal composition for an optical element comprising a mixture of a resin and a cross-linked macromolecular liquid crystal comprising macromolecular liquid crystal cross-linked through a reactive group, wherein the cross-linked macromolecular liquid crystal is dispersed into the resin.

3. An optical element comprising a molded body of a composition of a cross-linked macromolecular liquid crystal comprising macromolecular liquid crystals cross-linked through a reactive group, and a resin, wherein the cross-linked macromolecular liquid crystal is granular.

4. An optical element comprising a molded body of a composition of a cross-linked macromolecular liquid crystal comprising macromolecular liquid crystals cross-linked through a reactive group, and a resin, wherein the cross-linked macromolecular liquid crystal is dispersed into the resin.

5. A macromolecular liquid crystal composition according to claim 1, wherein the cross-linked macromolecular liquid crystal is dispersed in the resin.

6. A macromolecular liquid crystal composition according to claim 1, wherein the macromolecular liquid crystal is a side-chain type of macromolecular liquid crystal.

7. A macromolecular liquid crystal composition according to claim 6, wherein the side-chain type of macromolecular liquid crystal comprises a mesogen moiety and a non-mesogen moiety in its side chain.

8. A macromolecular liquid crystal composition according to claim 1, wherein the average granular diameter of the granules of the cross-linked macromolecular liquid crystal is in the range of 0.1 through 10 $\mu$m.

9. A macromolecular liquid crystal composition according to claim 1, wherein the granule of the cross-linked macromolecular liquid crystal has a multi domain construction having optical anisotropy.

10. A macromolecular liquid crystal composition according to claim 1, wherein the resin is cross-linked.

11. A macromolecular liquid crystal composition according to claim 1, wherein the difference between the refractive index of the resin and the refractive index of the macromolecular liquid crystal in an isotropic condition is 0.2 or lower.

12. An optical element according to claim 2, wherein the molded body of the composition is formed into a layer form, the layer of the composition being provided on a substrate.

13. An optical element according to claim 12, wherein a light reflection layer is provided between the substrate and the layer of the composition.

14. An optical element according to claim 13, wherein a protective layer is provided on the layer of the composition.

15. An optical element according to claim 12, which is used as a light scattering type of optical element.

16. An optical element according to claim 12, wherein a light scattering property changes reversibly by external stimulus.

17. A macromolecular liquid crystal composition according to claim 1, wherein said cross-linked macromolecular liquid crystal occupies 20 through 99% by weight of the composition.

18. A method of manufacturing an optical element comprising a molded body of a composition of a cross-linked macromolecular liquid crystal and a resin, comprising the steps of:

adding into the resin a macromolecular liquid crystal prepared in advance;

cross-linking the macromolecular liquid crystal; and molding the composition obtained.

19. A method of manufacturing an optical element comprising granules of a cross-linked macromolecular liquid crystal and a resin, comprising the steps of:

preparing the granules of the cross-linked macromolecular liquid crystal in advance by a physically or chemically crushing manner, or by a granule production polymerizing method;

adding the granules into the resin; and molding the composition obtained.

20. A macromolecular liquid crystal composition according to claim 1, wherein the macromolecular liquid crystal contains the reactive group as one moiety of a main chain or a side chain and the liquid crystal is cross-linked through the reactive group.

21. A macromolecular liquid crystal composition according to claim 20, wherein the reactive group is selected from the group consisting of a vinyl group, an acrylate group, a methacrylate group, an epoxy group, an isocyanate group, a hydroxy group, an amino group, an acid amide group, a thiol group, a carboxyl group, a sulfonic acid group, a phosphorus acid group, a metal alcoholate group, and a magnesium halide (Grignard) group.

22. A macromolecular liquid crystal composition according to claim 1, wherein the macromolecular liquid crystal is obtained by mixing a precursor of the macromolecular liquid crystal and a cross-linking monomer; and polymerizing the mixture.

23. A macromolecular liquid crystal composition according to claim 22, wherein the cross-linking monomer is selected from the group consisting of (meta)acrylic acids, (meta)acrylic acid esters, (meta)acrylic acid amides, vinyl compounds, styrenes, and unsaturated compounds.

24. A macromolecular liquid crystal composition according to claim 22, wherein the cross-linking monomer is selected from the group consisting of (meta)acrylic acid, ω-carboxy-polycaprolactone-mono(meta)acrylate, hydroxyethyl(meta)acrylate, hydroxypropyl(meta)acrylate, 2-(meta)acryloxyethyl acid phosphate, 2-hydroxy-3-phenoxy propyl(meta)acrylate, 2-(meta)acryloxyethyl succinate, monovinyl phthalate, 2-(meta)acryloxyethyl phthalate, maleic acid, 4-(meta)acryloxyalkyloxybenzoic acid, glyceryl(meta)acrylate, meta(acryl)amide, N,N-dimethyl amino ethyl(meta)acrylate, N,N-diethyl amino ethyl(meta)acrylate, glycidyl(meta)acrylate, vinyl sulfonate, hydroxy group-substituted styrene, 2-propene-1-ol, and 5-hexene-1-ol.

* * * * *